M. H. COLLINS.
Glass-Molds for Forming Lamp-Chimneys.
No. 136,971. Patented March 18, 1873.
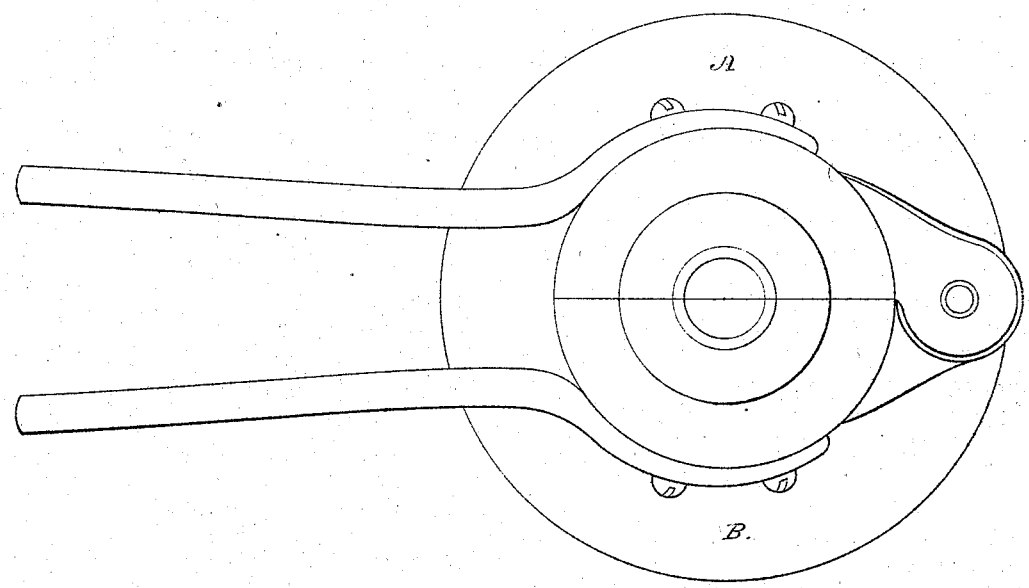
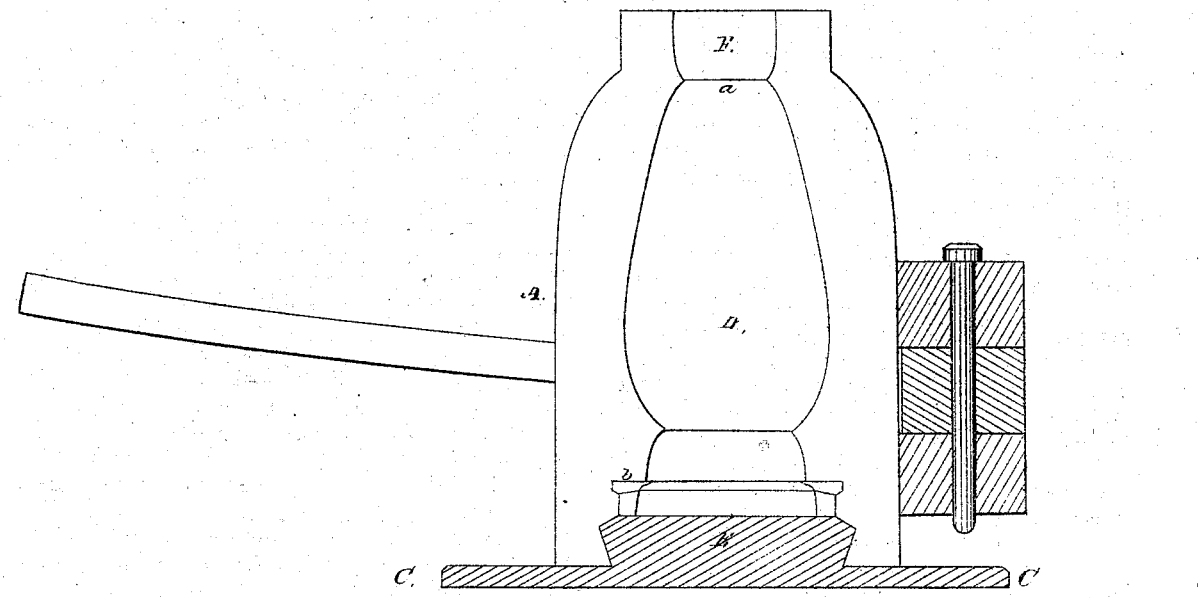
Witnesses
John B. Niles
Nath'l Niles
Inventor.
M. H. Collins

UNITED STATES PATENT OFFICE.

MICHAEL H. COLLINS, OF CHELSEA, MASSACHUSETTS.

IMPROVEMENT IN GLASS-MOLDS FOR FORMING LAMP-CHIMNEYS.

Specification forming part of Letters Patent No. 136,971, dated March 18, 1873.

*To all whom it may concern:*

Be it known that I, MICHAEL H. COLLINS, of Chelsea, in the county of Suffolk and State of Massachusetts, have invented an Improvement in Molds for Forming Glass Lamp-Chimneys; and do hereby declare the same to be fully described in the following specification and represented in the accompanying drawing, in which—

Figure 1 denotes a top view of a mold constructed in accordance with my invention; and Fig. 2, a sectional elevation of one-half thereof.

My invention has reference to molds for forming glass lamp-chimneys, such mold being made in halves or sections, and mounted upon a base in the ordinary manner.

The object of my invention is to provide a stationary mold for making glass lamp-chimneys, &c., with a sure and adequate means of determining and cutting or partially severing the glass blank at the desired planes to form the top and bottom of the chimney, so as to enable the surplus glass to be readily and easily removed, and thereby give a perfect uniformity in the length of the chimneys or articles produced; and my invention consists in providing the mold with segmental knives or creasers so arranged as to groove or partially sever the glass while being blown in planes to form the extremities of the article, and thereby enable the glass to be easily and with certainty broken at such indented or reduced parts.

In the drawing, A and B denote the two halves of the mold, and C the base-plate thereof. D is the matrix, which may be of any desirable form. Within each section of the said matrix I dispose one or more curved segmental knives or sharp edges $a$ and $b$—the same being respectively located near the top and bottom of the mold, and so arranged as to form a circle around the same—such being for the purpose of grooving or partially severing the glass while being blown at points determining the top and bottom of the chimney. These knives or sharp edges may be formed of thin plates of steel inserted and secured in grooves formed in the surface of the matrix, or may be formed on the matrix when cast; but I prefer the former, as it gives a better-defined edge. E is a boss or table disposed upon the central part of the base C, and upon which the glass is supported while being blown—the said boss being formed dovetailing around its periphery to receive a correspondingly-shaped groove formed on the inner face of the mold. F is the "blowover" chamber, which is arranged above the upper creaser or knife $a$, such chamber being to enable the glass to be blown of a uniform thickness to a point above the said edge, so that whenever the blowover or surplus glass is removed the chimney will present a perfect uniformity of thickness.

By forming the matrix with knives or creasers, arranged as described, the length of the chimneys is not only uniformly determined, but the surplus glass can be removed with great exactness and facility and with little or no liability of improper fracture of the glass, as is the case with chimneys shaped in molds unprovided with such creasing or cutting devices. The chimney thus formed may have its top and bottom edges finished in any of the known methods.

What I claim as my present invention is as follows:

In a stationary glass-mold for making lamp-chimneys, formed in sections as specified, the arrangement of one or more fixed segmental creasers or knives in each section, in manner as shown and described.

MICHAEL H. COLLINS.

Witnesses:
JOHN B. NILES,
NATHNL. NILES.